United States Patent [19]

Dotschkal et al.

[11] 4,019,677
[45] Apr. 26, 1977

[54] HEATING SYSTEM FOR BUILDING STRUCTURES

[76] Inventors: Anton A. Dotschkal, R.D. 2 Fairville Road; James J. Massaro, R.D. 2 Desmith Road, both of Newark, N.Y. 14513

[22] Filed: June 4, 1976

[21] Appl. No.: 693,106

[52] U.S. Cl. .............................. 236/9 A; 126/132; 237/8 R
[51] Int. Cl.² .......................................... F24B 9/04
[58] Field of Search ............ 237/8 R, 51, 1 A, 63, 237/8 C; 126/132; 219/279; 236/9 A

[56] References Cited

UNITED STATES PATENTS

| | | | |
|---|---|---|---|
| 3,958,755 | 5/1976 | Cleer, Jr. | 237/8 R |
| 3,977,601 | 8/1976 | Bearzi | 237/8 R |
| 3,989,183 | 11/1976 | Gustafsson | 237/8 R |

*Primary Examiner*—William E. Wayner
*Attorney, Agent, or Firm*—Fred L. Denson

[57] ABSTRACT

An improved heating system for a building structure is described. The improved system utilizes heat generated by a fireplace as a supplemental source for a standard furnace heating system. The fireplace heat is used to heat water or another heat exchange medium in a heat exchange coil situated within a fireplace. When the water reaches a predetermined temperature, a first pump is activated and causes the water to be pumped throughout the radiators within the building and subsequently returned to the fireplace. When the temperature of the water falls below a certain level, a thermostatic switch deactivates the pump. When the temperature in the building declines below the thermostat setting for sensing the ambient building temperature, the furnace and a second pump are activated which in turn heat the water and circulate it throughout the structure. A system of one way check valves prevents the water from flowing in the furnace leg when the fireplace leg is operating and vice versa. The capacity of the first pump and the setting of the thermostatic switch are selected so that the heat supplied by the fireplace leg is approximately equal to the heat loss of the building structure and also to allow for the automatic start up of the furnace leg and shut down of the fireplace leg when the water within the heat exchange coil reaches a preset temperature. The improved heating system of this invention allows for increased efficiency, safety, comfort and convenience of operation.

9 Claims, 3 Drawing Figures

HEATING SYSTEM FOR BUILDING STRUCTURES

BACKGROUND OF THE INVENTION

This invention relates to an improved heating system for a building structure utilizing two sources of heat.

With the advent of the energy crisis and the concomitant increase in the cost of energy, considerable efforts have been directed toward developing means and methods for conserving energy. In this regard, significant attention has been devoted to the revival of fireplaces for heating houses and other types of building structures. Some of these systems, such as that described in U.S. Pat. No. 549,071 of Aug. 11, 1925, utilize a fireplace to heat water for radiators in a house. Other systems, including the one described in Popular Mechanics (Oct. 1974, page 154 et seq), utilize a fireplace in conjunction with a standard oil or gas-fired furnace to heat water for the radiators. These systems can be operated on a cost saving basis compared to conventional systems primarily because of the lower cost of energy derived from wood fuel compared to the cost of energy derived from oil or gas. However, while advantageous from an economic standpoint, they are frequently disadvantageous from a standpoint of convenience, efficiency, control, safety and comfort.

It is not unusual for a house to become uncomfortably warm when using a fireplace to heat radiator water. Moreover, systems which are not properly installed or use improper equipment can pose substantial safety hazards in that high pressures and temperatures often build up within the system. In order to provide appropriate temperature control, some systems require the user to close a series of gate valves to stop water from flowing from the fireplace heater which in turn can cause undesirable temperature and pressure buildup of the residual water in the fireplace unit. While such systems result in a monetary savings, they are relatively inefficient.

The water heated by the fireplace often times is pumped through a non-operational furnace where a heat loss is encountered (because of the additional distance involved) prior to entering the radiators. This water is usually pumped by a continuously operated furnace pump which is designed to pump water heated by the furnace at a flow rate which is optimized for maximum heat transfer for the furnace water temperature and not for the fireplace water temperature. Thus, a pump thermally suitable for use with furnace water is generally not thermally suitable for fireplace water. A furnace pump is usually designed for intermittent operation responsive to a thermostat setting. It is designed to produce high flow rates for short periods of time in order to deliver a quantity of heat to a building to bring it back up to the thermostat setting as quickly as possible. Based on the heat transfer equation for water flow in a conduit, $Q = W C_p \Delta T$ (where Q is the heat transferred, W is the flow rate of the water, $\Delta T$ is the temperature differential between the water entering and leaving the furnace and $C_p$ is a constant), it is apparent that when the furnace pump is not operational, the flow rate W of water is zero and there is no heat transferred. When the furnace pump is operational, W has a value and heat is transferred. Because of its intermittent operation, a furnace pump has a larger capacity than would be necessary if it were operated on a continuous basis for the delivery of a given quantity of heat. Obviously, unnecessary electrical energy is used when a high capacity furnace pump is used to continuously circulate fireplace water. Finally, most of the prior art systems are relatively inconvenient to operate. In addition to manually opening and closing gate valves, a user is required to turn the furnace off when the fireplace is in use by lowering the thermostat or resetting other controls or is required to shut the fireplace down when the furnace is in operation.

OBJECTS OF THE INVENTION

It is therefore an object of the invention to provide an improved system for heating a building structure.

It is another object of this invention to provide an improved system for heating a building structure which is efficient and convenient to operate.

It is a further object of this invention to provide an improved system for heating a building structure which is safe in operation and comfortable to the user.

An additional object of this invention is to provide an improved system for heating a building structure which is readily adaptable to existing heating systems.

SUMMARY OF THE INVENTION

These and other objects of the invention are accomplished by an improved heating system which uses heat generated by a fireplace as a supplemental source for a furnace heating system for a building structure. The fireplace heat is used to heat water or another heat exchange medium in a heat exchange coil situated within a fireplace. When the water reaches a predetermined temperature, a first pump is activated and causes the water to be pumped throughout the radiators within the building and subsequently returned to the fireplace. When the temperature of the water falls below a certain temperature, a thermostatic switch deactivates the pump. When the temperature in the building declines below the thermostat setting for sensing the ambient building temperature, the furnace and a second pump are activated which in turn heat the water and circulate it throughout the structure. A system of one way check valves prevents the water from flowing in the furnace leg when the fireplace leg is operating and vice versa. The capacity of the first pump and the setting of the thermostatic switch are selected so that the heat supplied by the fireplace leg is approximately equal to the heat loss of the building structure and also to allow for the automatic start up of the furnace leg and shut down of the fireplace leg when the water within the heat exchange coil reaches a preset temperature. The improved heating system of this invention allows for increased efficiency, safety, comfort and convenience of operation.

DETAILED DESCRIPTION OF THE INVENTION

Figure 1:
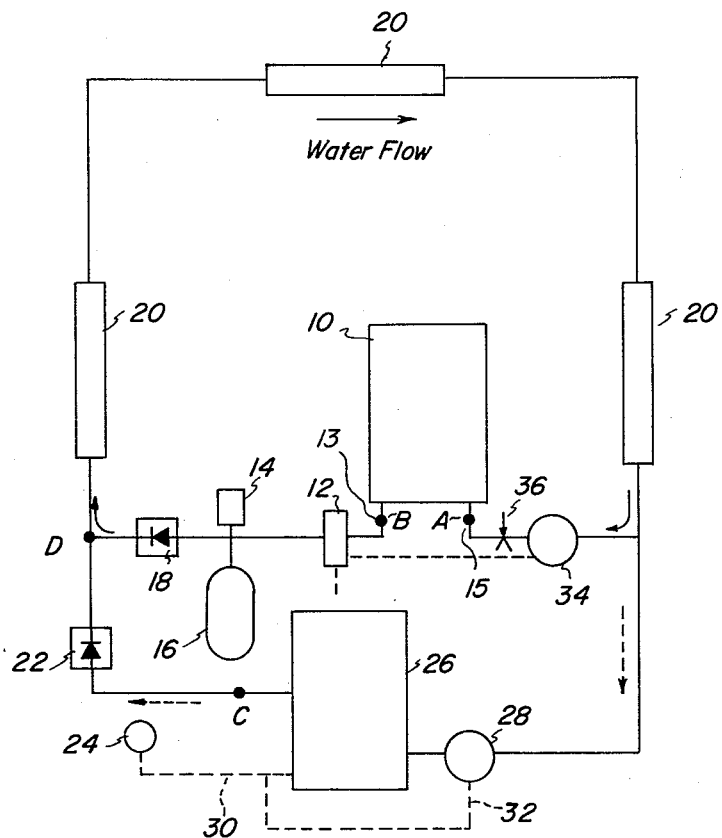
FIG. 1 is a schematic view of the improved heating system of the invention.
Figure 2:
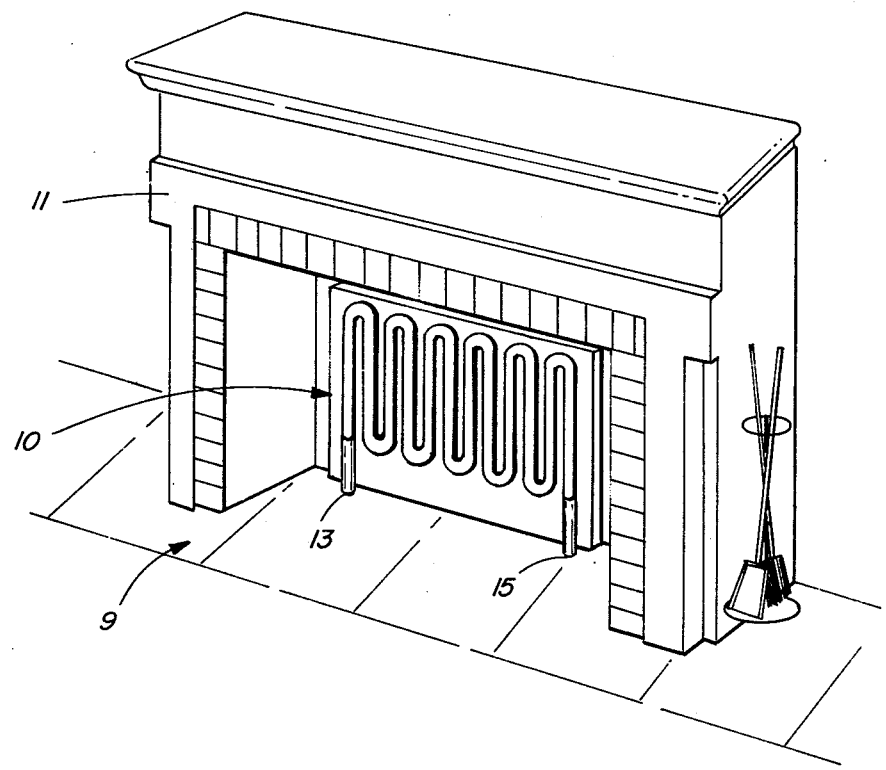
FIG. 2 is a perspective view of a fireplace and heat exchange coil used in conjunction with the system of FIG. 1.

The heating system of FIG. 1 includes a heat exchange coil 10 having inlet 15 and outlet 13. The coil used may be of any suitable design so long as it can safely withstand the temperatures and pressures associated with its use. An especially suitable coil is one having a serpentine pass design such as Platecoil Style 60 by Tranter, Inc. The coil 10 is usually installed on the base 9 and at the back of a fireplace 11 (FIG. 2). Inlet 15 and outlet 13 are downwardly positioned to communicate with conduits situated below the surface of the floor. A thermostatic switch 12 is situated in close proximity to heat exchange coil outlet 13 and senses the temperature of the water at point B. The switch is preset at a temperature such that when the temperature of the water at point B falls below the preset temperature, pump 34 is deactivated. Expansion tank 16 and air purge valve 14 are in fluid conducting relationship with outlet 13 and one way check valve 18. When the pressure at point D is greater than the pressure at point B, valve 18 prevents water from flowing into coil 10 through outlet 13. The heated water flows through radiators 20 which in turn impart heat to the building structure. The water is returned to coil 10 by pump 34 and inlet line 15 which contains pressure relief valve 36.

When fireplace 11 is not in operation or when insufficient heat is produced by the fireplace to impart a sufficiently high temperature to the water at point B, pump 34 does not operate. However, usually furnace 26 becomes operable at this point since the ambient building temperature sensed by thermostat 24 will be at or below the thermostat setting thereby causing the furnace 26 and pump 28 to become operable. Heated water discharged at point C passes through one way check valve 22, through radiators 20 and is returned to the inlet side of furnace 26 by pump 28. When pump 28 is not operating and pump 34 is operating, the pressure at point D is greater than the pressure at point C thereby preventing water from flowing into the outlet of the furnace. Since pump 28 is subject to intermittent operation responsive to thermostat 24 whereas pump 34 operate continuously responsive to thermostatic switch 12, the same quantity of heat for a given period of time can be transferred at lower flow rates when the fireplace leg of the system is operational than when the furnace leg is operational. Thus, pump 34 generally has a smaller capacity than pump 28. This is particularly beneficial from an energy conservation viewpoint since pump 34 operates continuously when the fireplace leg is operating.

Functionally, the system is self-regulating and is activated when a flame against coil 10 sufficiently heats the internal water. This water is then circulated through the radiators 20 by the pump 34 which is controlled by thermostatic switch 12. The heat produced by the fireplace leg is designed, through properly adjusting thermostatic switch 12 and controlling the flow rate of water by pump 34, to offset the heat loss through the walls of the building structure. However, should the fireplace leg not be able to impart sufficient temperature increase to the water at point B to provide enough heat to offset the building heat loss, the temperature within the building will drop below the thermostat 24 setting and the furnace leg will become activated.

Regulation and temperature control is accomplished through a simplified method, which can be explained by the following heat transfer relationships:

The amount of heat loss (Q) that flows through any body or structure varies directly with the time of flow (*t*), the area (A) through which it flows and the temperature gradient ($\Delta t / \Delta L$) determined by the interior to exterior temperature difference ($\Delta T$), distance ($\Delta L$) and the thermal conductivity (K) of the structure, or $$Q = K A^t \frac{\Delta T}{\Delta L}$$

In any given four hour period the outdoor temperature will not normally vary to any great extent and for practical purposes is a relative constant. A four hour period is designated because of the necessity to tend a fire approximately every 4 hours. With an established indoor temperature, and a relatively constant outdoor temperature, the temperature gradient now also becomes a constant. Thus when the structure is raised to a desired temperature by an existing or conventional furnace, and the heat loss over a period of time is constant, a supplemental source of heat with a constant output of equal value will maintain an ambient condition.

To establish a constant output heat source, several factors are taken into consideration. For example a constant circulation of water by pump 34 provides a regulation or dampening effect on minor irregularities in the combustion process. It also regulates, with a lower but constant temperature output, as opposed to the on-off extreme temperature cycles experienced in normal furnace operation. The heat value produced in the combustion of wood or other natural fuels is usually consistent but can be of different consistent values determined by the type of fuel and the quantity engaged in combustion. The placement of the grate in relation to the heat exchange coil is a variable used during the combustion process for regulation of heat to a finer degree. The size of the coil is generally based upon the extent of the heat loss of the structure in which it is installed. When the unit cannot match the heat loss of the structure due to a lessening of the fire, sudden decrease or extremely cold outdoor temperature, the furnace can supply heat unaffected by normal unit function.

Figure 3:
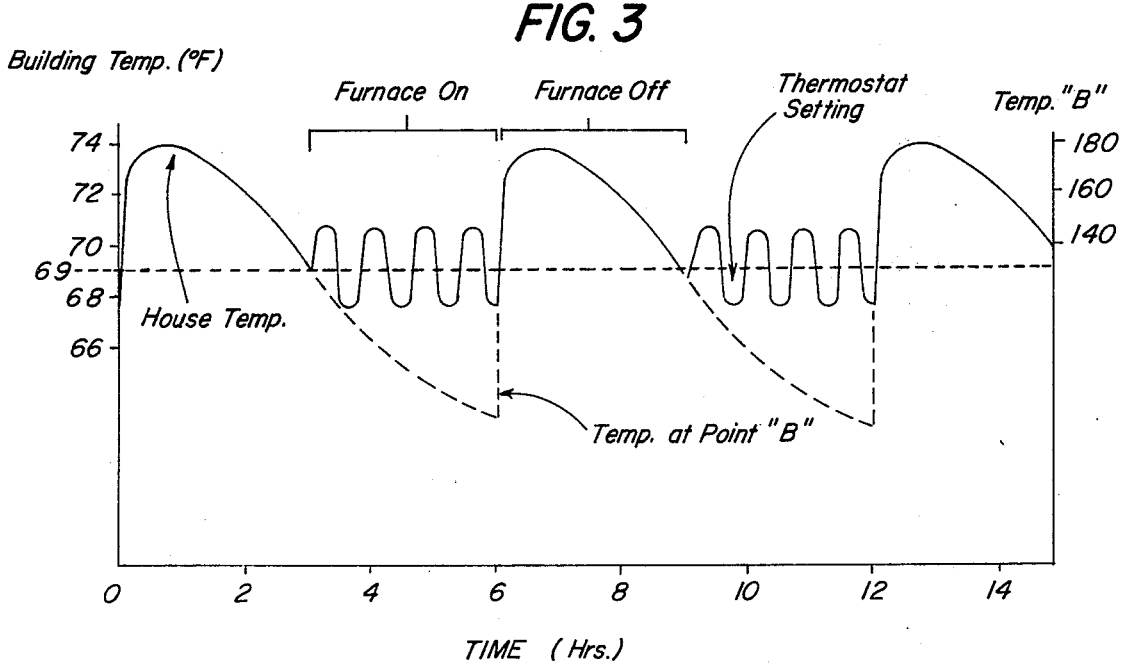
FIG. 3 is a graph showing the heating characteristics of the improved heating system of this invention.

As an example of the operation of the system, FIG. 3 depicts ambient building temperature as a function of time and the water temperature at point B for both fireplace operation and furnace operation. At time O, the building is brought up to the thermostat setting of 69° F by the furnace leg. A fire is built in the fireplace and the thermostatic switch 12 is set at 140° F. Pump 34 is activated when the water temperature at point B exceeds 140° F. Usually the temperature at point B will go as high as 180° F when a log is placed on the fire and then gradually decline as a function of time until another log is placed on the fire which occurs at six hours in FIG. 3. However, after three hours when the ambient temperature in the building falls below 69° F which is the thermostat setting, the furnace leg becomes activated. Because the furnace and pump 32 are subject to intermittent operation, the temperature of the building fluctuates within 2° of the thermostatic setting until the fire is restoked (six hours). The process is continued as long as heat is necessary. It is to be understood that the fireplace could be restoked after 3 hours thereby eliminating operation of the furnace completely or at any other interval at the convenience of the user.

In accordance with the invention described herein, the fireplace leg is designed to be a supplemental source of heat and is not designed to raise the temperature of a building by a significant number of degrees.

The selection of the setting for the thermostatic switch 12 and the capacity of pump 34 are based upon the heat loss characteristics of the building structure in which it is used. Usually, switch 12 will be set at a particular temperature within 20° F of 140° F. When ¾ inch piping is employed, a pump having a capacity of ten gallons per minute at a ten foot head will be employed (such as Taco SD100-21T). Pressure relief valve 36 is usually set to open for pressures acquired when the temperature within the system exceeds 180° F. While water is the preferred heating medium, other liquids suitable for this purpose may be employed.

The heating system described herein has several advantages over prior art systems. Since pump 34 operates continuously when the fireplace leg is in operation, the heat supplied to the building is constant, uniform and does not fluctuate thus lending to the comfort of the occupants. Moreover, because the pump 34 is much smaller than the furnace pump 28, it uses a much smaller quantity of electrical energy. The system of one way check valves and pressure relief valves insure the safety aspects of the invention for domestic use. From a convenience and control standpoint even though the fireplace leg is separate from the furnace leg, both systems are dependent upon the heat loss from the house and thus cooperatively function in conjunction with each other. This unique interrelationship removes the need to manually open or close valves or reset thermostats when changing from one leg to another since this is accomplished automatically. In summary, the improved system described herein provides a reliable and versitle source of inexpensive heat which would otherwise be lost in many other fireplaces. The supplemental heat can be regulated to provide a comfortable building temperature with a minimum of manual care.

The invention has been described with reference to a preferred embodiment thereof, but it is to be understood that variations and modifications can be effected within the spirit and scope of the invention.

We claim:

1. A heating system for a building structure comprising in combination:
   a. a first heating unit comprising a fireplace;
   b. a heat exchange coil having an inlet and an outlet for a heating medium situated within said fireplace;
   c. a first pumping means in fluid conducting relationship with the inlet of said heat exchange coil;
   d. first control means for sensing the temperature of the heating medium at the outlet of said heat exchange coil and for activating and deactivating said first pumping means responsive to the sensed temperature;
   e. a first flow control means in fluid conducting relationship with the outlet of said heat exchange coil for controlling the direction of flow of the heating medium;
   f. a second heating unit having an inlet and outlet for heating said medium;
   g. second pumping means in fluid conducting relationship with the inlet of said second heating unit;
   h. second control means for sensing the ambient temperature within the building structure and activating or deactivating said second heating unit and said second pumping means responsive to the sensed temperature;
   i. second flow control means in fluid conducting relationship with the outlet of said second heating unit for controlling the direction of flow of the heating medium; and
   j. heat radiation means in fluid conducting relationship with said first and second flow control means and said first and second pumping means.

2. The heating system of claim 1 where the first control means comprises a thermostatic switch.

3. The heating system of claim 1 where the first flow control means is a one way check valve.

4. The heating system of claim 1 where the second heating unit is a furnace.

5. The heating system of claim 1 where the second control means is a thermostat.

6. The heating system of claim 1 where the second flow control means is a one way check valve.

7. The heating system of claim 1 including means for reducing excessive internal pressure in fluid conducting relationship with said first pumping means and the inlet of said heat exchange coil.

8. The heating system of claim 1 including a liquid expansion tank and means for venting air entrapped in said system.

9. The heating system of claim 2 wherein the temperature setting of the thermostatic switch and the capacity of said first pumping means are sufficient to allow the heat supplied by the heating medium to the building structure to offset the heat loss of the building structure.

* * * * *